(12) United States Patent
Koike-Akino et al.

(10) Patent No.: US 8,472,550 B2
(45) Date of Patent: Jun. 25, 2013

(54) METHOD FOR REDUCING INTERFERENCE IN MULTI-CELL MULTI-USER WIRELESS NETWORKS

(75) Inventors: Toshiaki Koike-Akino, Cambridge, MA (US); Tiangao Gou, Irvine, CA (US); Man-On Pun, Jersey City, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 370 days.

(21) Appl. No.: 12/978,072

(22) Filed: Dec. 23, 2010

(65) Prior Publication Data

US 2012/0163433 A1   Jun. 28, 2012

(51) Int. Cl.
*H04B 15/00* (2006.01)
(52) U.S. Cl.
USPC ............................. 375/285; 375/267; 375/220
(58) Field of Classification Search
USPC .......................................... 375/267, 285, 220
See application file for complete search history.

(56) References Cited

U.S. PATENT DOCUMENTS

2009/0325591 A1* 12/2009 Liu et al. ................... 455/452.2

FOREIGN PATENT DOCUMENTS

WO   WO 2009120048 A2 * 10/2009

* cited by examiner

*Primary Examiner* — Sam K Ahn
*Assistant Examiner* — Janice Tieu
(74) *Attorney, Agent, or Firm* — Dirk Brinkman; Gene Vinokur

(57) ABSTRACT

This invention provides a method for exploiting precoder optimization gains and multi-user diversity gains with interference alignment in general MIMO wireless networks including multiple users. Specifically, two embodiments exploit either a gradient-based search or iteratively orthogonalizing inference. The method can achieve near-optimal performance at a low complexity. Furthermore, a scheduling criterion is provided for wireless networks comprised of a large number of mobile stations in each cell. The criterion can be done independently in each cell to significantly reduce information exchanged between base stations in different cells compared to the methods that perform joint scheduling over all cells. The two embodiments can be utilized in a spectrally efficient communications network equipped with relaying nodes.

3 Claims, 6 Drawing Sheets

Fig. 2

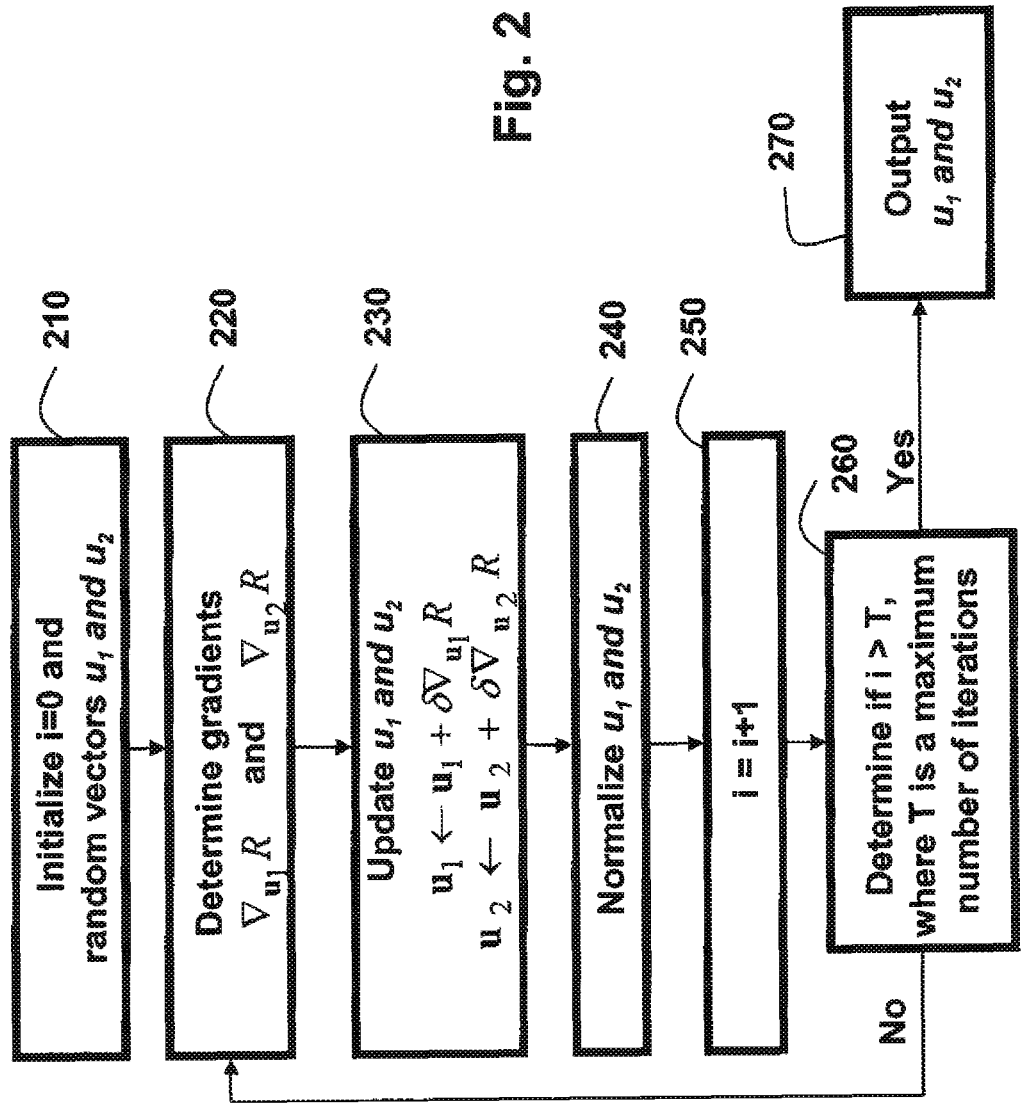

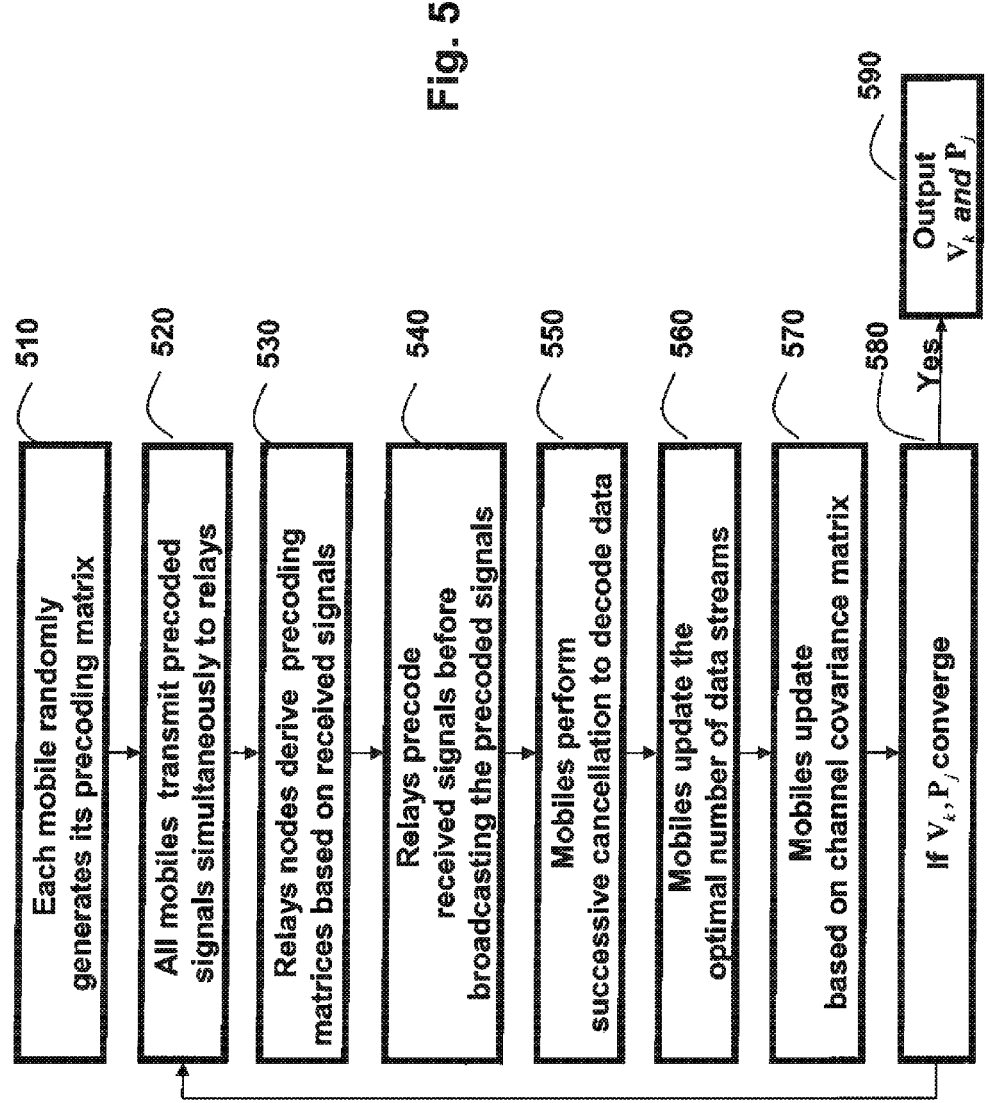

METHOD FOR REDUCING INTERFERENCE IN MULTI-CELL MULTI-USER WIRELESS NETWORKS

FIELD OF THE INVENTION

This invention relates to wireless communication networks, and more particularly, to reducing interference at wireless transceivers.

BACKGROUND OF THE INVENTION

Interference is a major obstacle in implementing high-performance wireless communication networks. To circumvent this obstacle, one prior-art method uses interference alignment and cancellation (IAC). That method maximizes dimensions of a desired signal, also known as degrees of freedom (DoF), by confining interference signals into a smaller subspace via intelligent transmit precoder design. However, it is well-known that the DoF-maximizing precoder design is not unique. Furthermore, precoders with the same maximum achievable DoF can result in different data rates.

Other methods design an optimal transmit precoder that maximizes the DoF and an achievable data rate based on closed-form interference alignment or iterative distributed interference alignment. However, those methods were developed for either single-input single-output (SISO) networks or three-user multi-input multi-output (MIMO) networks. Thus, those methods are not applicable to general MIMO wireless networks with an arbitrary number of users (transceivers or mobile stations), e.g., greater than three.

SUMMARY OF THE INVENTION

The embodiments of the invention provide precoder methods that achieve a maximum degree of freedom (DoF) and a maximum data rate for general wireless MIMO networks including multiple transceivers (users or mobile stations) in each cell by optimizing interference alignment directions and scheduling of transmissions. More specifically, the invention provides a gradient-based procedure, and a low-complexity method that iteratively orthogonalizes interference.

Furthermore, the invention provides a scheduling method to achieve additional multi-user diversity gains in the presence of multiple mobile stations in each cell. In contrast to the prior art that performs joint scheduling over multiple cells, the embodiments of the invention perform optimal scheduling independently for each cell, which leads to significant overhead and computation reductions.

Finally, the invention provides a spectrally efficient communication protocol comprised of multiple mobile stations and relay nodes by maximizing the available DoF. The embodiments of the invention perform simultaneous forward and reserve link transmissions with the help of relay nodes.

BRIEF DESCRIPTION OF THE DRAWINGS

FIG. 2 is a flow diagram of a gradient-based procedure for optimizing precoding vectors according to embodiments of the invention;

FIG. 5 is a flow diagram of a communication protocol enabling simultaneous forward and reserve link transmissions according to embodiments of the invention.

DETAILED DESCRIPTION OF THE PREFERRED EMBODIMENTS

Signal Model

Figure 1A:
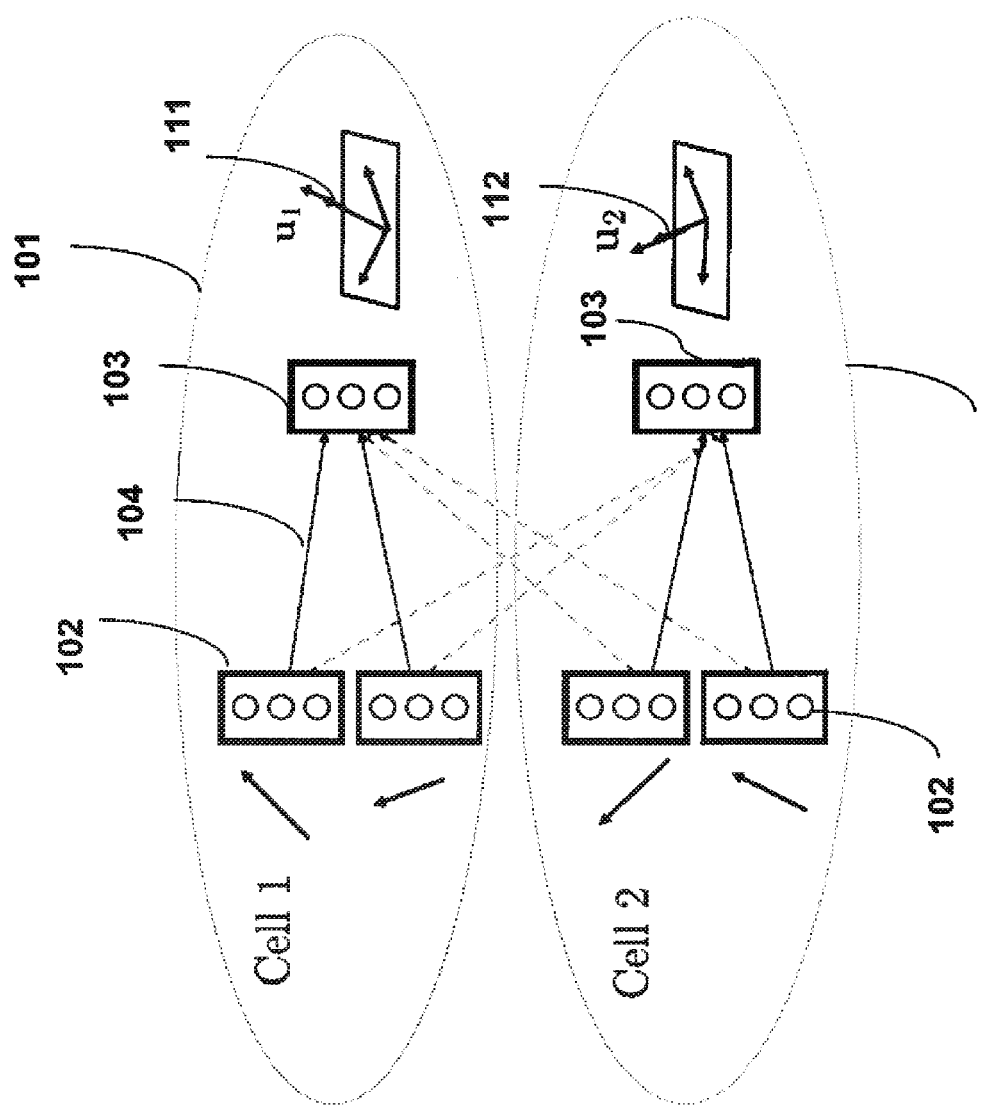
FIG. 1A is a schematic of a two-cell wireless network with two mobile stations in each cell according to embodiments of the invention.

As shown in FIG. 1A, a wireless network includes two cells 101. There are K mobile stations (users) 102 and a base stations (BS) 103 in each cell. All mobile stations and base stations (BS) are equipped with M antennas. For simplicity, we describe the uplink 104 from the mobile station to the base station in detail. The downlink from the BS can be solved similarly due to the duality of linear interference alignment between the uplink and the downlink.

We consider K=M−1 mobile stations in each cell. Each mobile station transmits a data stream with precoding to the BS. The received signal y at the base station in the $j^{th}$ cell is written as $$y_j = \sum_{i=1}^{M-1} \sum_{k=1}^{2} H_{jk}^{[i]} v_k^{[i]} x_k^{[i]} + n_j, \; j \in \{1, 2\},$$

where $H_{jk}^{[i]} \in C^{M \times M}$ is the channel matrix from mobile station i in cell k to cell j, $v_k^{[i]}$ is a unit-norm beamforming vector for mobile station i in cell k, $x_k^{[i]}$ is the transmitting stream from mobile station i in cell k, and $n_j : CN(0,I)$ is additive white Gaussian noise (AWGN) at BS j. The transmitter also satisfies an average power constraint, i.e., $$E(\|v_k^{[i]} x_k^{[i]}\|^2) \leq P,$$

where E is an expectation operator, P is the maximum total transmission power from the $k^{th}$ user and $\|\cdot\|$ is the Frobenius norm of the enclosed vector.

We denote the direction at receiver j by a unit-norm vector $u_j$, e.g., $u_1$ 111 and $u_2$ 112. At receiver 1, all the interference vectors from mobile stations in cell 2 should be received along direction $u_1$, i.e., $$\frac{H_{12}^{[i]} v_2^{[i]}}{\|H_{12}^{[i]} v_2^{[i]}\|} = u_1 \Longrightarrow v_2^{[i]} = \|H_{12}^{[i]} v_2^{[i]}\| H_{12}^{[i]-1} u_1. \quad (1)$$

Because $\|v^{[i]}_2\|$, normalizing $v_2^{[i]}$ yields $$v_2^{[i]} = \frac{H_{12}^{[i]-1} u_1}{\|H_{12}^{[i]-1} u_1\|}, \; \forall i \in \{1, \ldots, M-1\}. \quad (2)$$

In an analogous way, the precoding vectors for mobile stations in cell 1 are expressed as $$v_1^{[i]} = \frac{H_{21}^{[i]-1} u_2}{\|H_{21}^{[i]-1} u_2\|}, \forall i \in \{1, \ldots, M-1\}. \quad (3)$$

After we specify the alignment direction at BS 1 (and BS 2), i.e., $u_1$ (and $u_2$), beamforming vectors of mobile stations in cell 2 (and cell 1) can be determined.

Assuming Gaussian distributed signaling, i.e., $x_k^{[i]}$:CN(0, P), the achievable sum rate in cell 1 can be written as $$R_1 = \log\left|I + \sum_{i=1}^{M-1} P(H_{11}^{[i]} v_1^{[i]} v_1^{[i]\dagger} H_{11}^{[i]\dagger} + H_{12}^{[i]} v_2^{[i]} v_2^{[i]\dagger} H_{12}^{[i]\dagger})\right| -$$

$$\log\left|I + \sum_{i=1}^{M-1} P H_{12}^{[i]} v_2^{[i]} v_2^{[i]\dagger} H_{12}^{[i]\dagger}\right|.$$

where $|\cdot|$ and $(\cdot)^\dagger$ represent the determinant and the Hermitian conjugate of the enclosed matrix, respectively.

Substituting Eqns. (3) and (2) into the above expression, we obtain $$R_1 = \log\left|I + \sum_{i=1}^{M-1} P(a^{[i]2} H_{11}^{[i]} H_{21}^{[i]-1} u_2 u_2^\dagger H_{21}^{[i]-\dagger} H_{11}^{[i]\dagger} + b^{[i]2} u_1 u_1^\dagger)\right| - \quad (4)$$

$$\log\left(1 + \sum_{i=1}^{M-1} b^{[i]2} P\right),$$

where $$a^{[i]} = \frac{1}{\|H_{21}^{[i]-1} u_2\|}, b^{[i]} = \frac{1}{\|H_{12}^{[i]-1} u_1\|}. \quad (5)$$

Similarly, we can compute the sum rate for cell 2 as $$R_2 = \log\left|I + \sum_{i=1}^{M-1} P(b^{[i]2} H_{22}^{[i]} H_{12}^{[i]-1} u_1 u_1^\dagger H_{12}^{[i]-\dagger} H_{22}^{[i]\dagger} + a^{[i]2} u_2 u_2^\dagger)\right| - \quad (6)$$

$$\log\left(1 + \sum_{i=1}^{M-1} a^{[i]2} P\right).$$

The design objective is to maximize a sum of the rates in two cells with respect to the two alignment directions, more specifically, $$\max_{u_1, u_2} R = R_1 + R_2, \quad (7)$$

such that $$\|u_1\| = \|u_2\| = 1.$$

Because the optimization problem in Eqn. (7) is non-convex, it is generally difficult to obtain the optimal alignment directions in both analytical and numerical manners.

Optimization Method

Figure 1B:
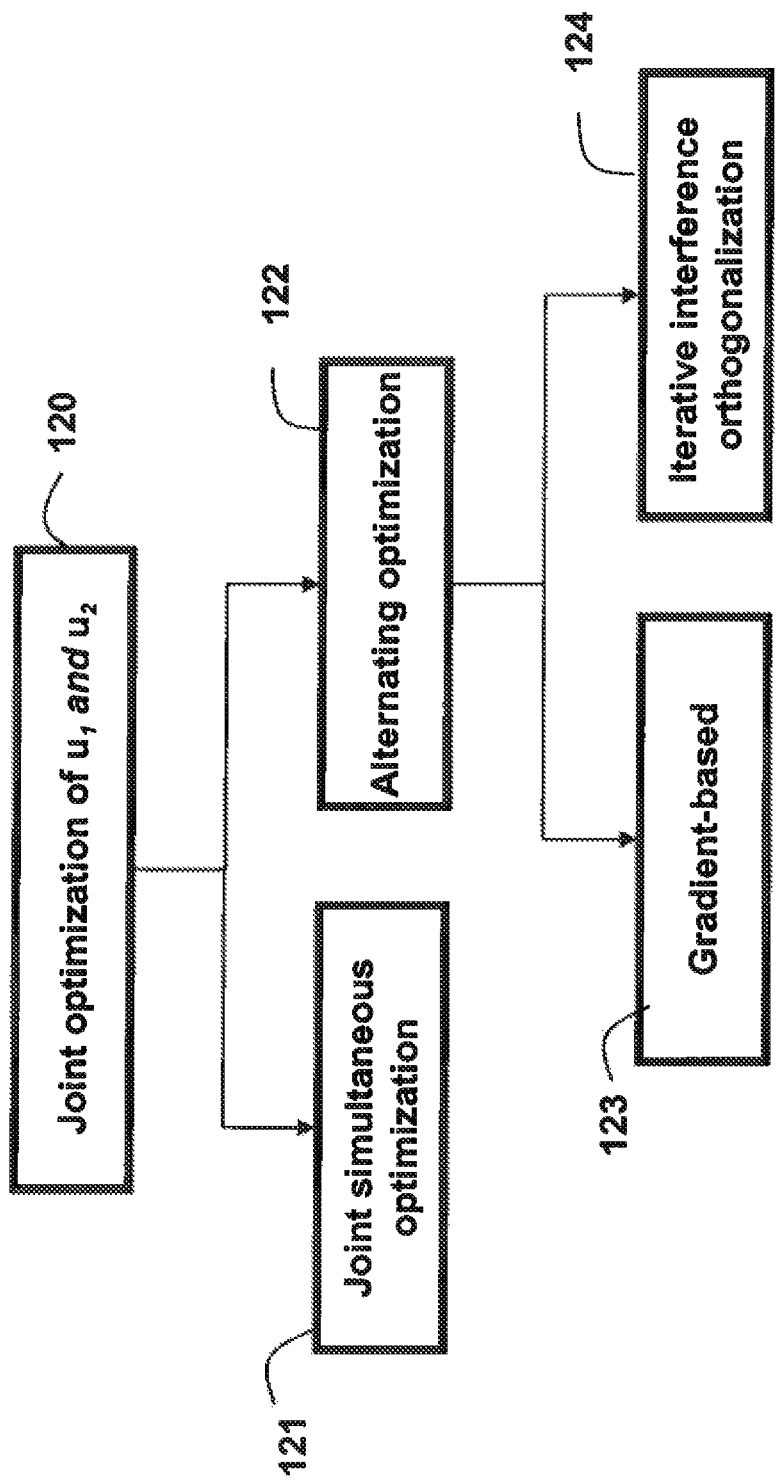
FIG. 1B is a flow diagram of a method for optimizing precoding vectors according to embodiments of the invention.

As shown in FIG. 1B, the optimization in Eqn (7) 120 can be resolved in two approaches as shown in FIG. 1B. In the first approach, joint optimization of $u_1$ and $u_2$ 121 provides an optimal solution by optimizing both $u_1$ and $u_2$ simultaneously. However, this approach incurs prohibitively expensive computation, which renders it impractical.

In contrast, the second approach alternating optimization 122 is suboptimal but of significantly reduced computational complexity. The alternating optimization approach partitions the parameters to be optimized into subsets and optimizes the subsets of parameters iteratively.

More specifically, during each iteration, the alternating optimization approach optimizes one subset of parameters while holding the other subsets of parameters fixed. As a result, the alternating optimization approach only has to search a reduced space in each iteration, which leads to significant computation reduction.

A termination condition, when satisfied, terminates the iteration procedure, e.g. reaching a pre-defined number of iterations. For an extreme case, each subset of parameters can contain as few as only one parameter. However, because the resulting parameters are optimized subset by subset, they are only locally optimal.

In the following, the alternating optimization approach is employed to resolve the optimization problem in Eqn (7). We partition $u_1$ and $u_2$ into two subsets with one subset containing $u_1$ and the other $u_2$. As described above, each subset is locally optimized while holding the other subset fixed.

Two methods are described to perform the local optimization over each subset of parameters, namely a gradient-based procedure 123 and a low-complexity method 124 that iteratively orthogonalizing interference. Despite the apparent similarities between these two methods, the gradient-based procedure derives the updates based on gradient search by differentiating a cost function with respect to $u_i$, while holding $u_j$ constant. In contrast, the low-complexity interference-orthogonalizing procedure 124 derives the updates by making $u_i$ orthogonal to the subspace spanned by interference signals.

Gradient Procedure

The gradient of the rate in terms of the alignment vectors is written as $$\nabla_{u_1} R_1 = P\left(\sum_{i=1}^{M-1} b^{[i]2}\right) Q_1^{-1} u_1 + \quad (8)$$

$$\sum_{i=1}^{M-1} b^{[i]4} H_{12}^{[i]-\dagger} H_{12}^{[i]-1} u_1 P\left(\frac{1}{1 + P \sum\limits_{i=1}^{M-1} b^{[i]2}} - u_1^\dagger Q_1^{-1} u_1\right),$$

$$\nabla_{u_1} R_2 = \quad (9)$$

$$\sum_{i=1}^{M-1} P b^{[i]2} \left(-b^{[i]2} H_{12}^{[i]-\dagger} H_{12}^{[i]-1} u_1 u_1^\dagger + 1\right) H_{12}^{[i]-\dagger} H_{22}^{[i]\dagger} Q_2^{-1} H_{22}^{[i]} H_{12}^{[i]-1} u_1,$$

where $$Q_1 = I + \sum_{i=1}^{M-1} P\left(a^{[i]2} H_{11}^{[i]} H_{21}^{[i]-1} u_2 u_2^\dagger H_{21}^{[i]-\dagger} H_{11}^{[i]\dagger} + b^{[i]2} u_1 u_1^\dagger\right), \quad (10)$$

$$Q_2 = I + \sum_{i=1}^{M-1} P\left(b^{[i]2} H_{22}^{[i]} H_{12}^{[i]-1} u_1 u_1^\dagger H_{12}^{[i]-\dagger} H_{22}^{[i]\dagger} + a^{[i]2} u_2 u_2^\dagger\right). \quad (11)$$

Hence, we have $$\nabla_{u_1} R = \nabla_{u_1} R_1 + \nabla_{u_1} R_2. \quad (12)$$

The gradient for $\nabla_{u_2} R$ can be obtained by changing $b^{[i]}$ to $a^{[i]}$ and the indices 1 to 2.

FIG. 2 shows the steps of our gradient-based optimization procedure, where $\delta$ is the step size and T is a maximum number of iterations. The steps can be performed in a processor connected to memory, and input/output interfaces as known in the art.

Step 210 initializes random vectors $u_1$ and $u_2$ and an iteration index i to zero.

Step 220 determines the gradient $\nabla_{u_1} R$ and $\nabla_{u_2} R$ as shown in Eqns. (8) and (9).

Step 230 updates $u_1$ and $u_2$ by $u_1 \leftarrow u_1 + \delta \nabla_{u_1} R$ and $u_2 \leftarrow u_2 + \delta \nabla_{u_2} R$.

Step 240 normalizing $u_1$ and $u_2$ to a unity norm.

Step 250 increases the iteration index i by one.

Step 260 checks if the iteration index exceeds a predetermined maximum number of iterations T. If no, return to 220. Otherwise if yes, step 270 outputs $u_1$ and $u_2$.

Although the above method can find a local optimum, convergence requires a relatively large number of iterations. Therefore, we provide a modified method to optimize the alignment directions with only a relatively small number of iterations.

Iteratively Orthogonalizing Interference

In high signal-to-noise ratio (SNR) regimes, we minimize the interference by setting the interference vector orthogonal to the desired signals. Motivated by this observation, we can align the interference orthogonal vector to the space spanned by the desired signal at both receivers, i.e., $$u_1 = \text{null}([H_{11}^{[1]} v_1^{[1]} \ldots H_{11}^{[M-1]} v_1^{[M-1]}]^\dagger), \quad (13)$$

$$u_2 = \text{null}([H_{22}^{[1]} v_2^{[1]} \ldots H_{22}^{[M-1]} v_2^{[M-1]}]^\dagger), \quad (14)$$

where null(A) denotes a null space of a matrix A.

Note that $v_1^{[i]}$ and $v_2^{[i]}$ are a function of $u_2$ and $u_1$ as in (3) and (2), respectively. Because it is not straightforward to obtain a closed-form solution to fulfill the above conditions, an iterative method is provided.

Figure 3:
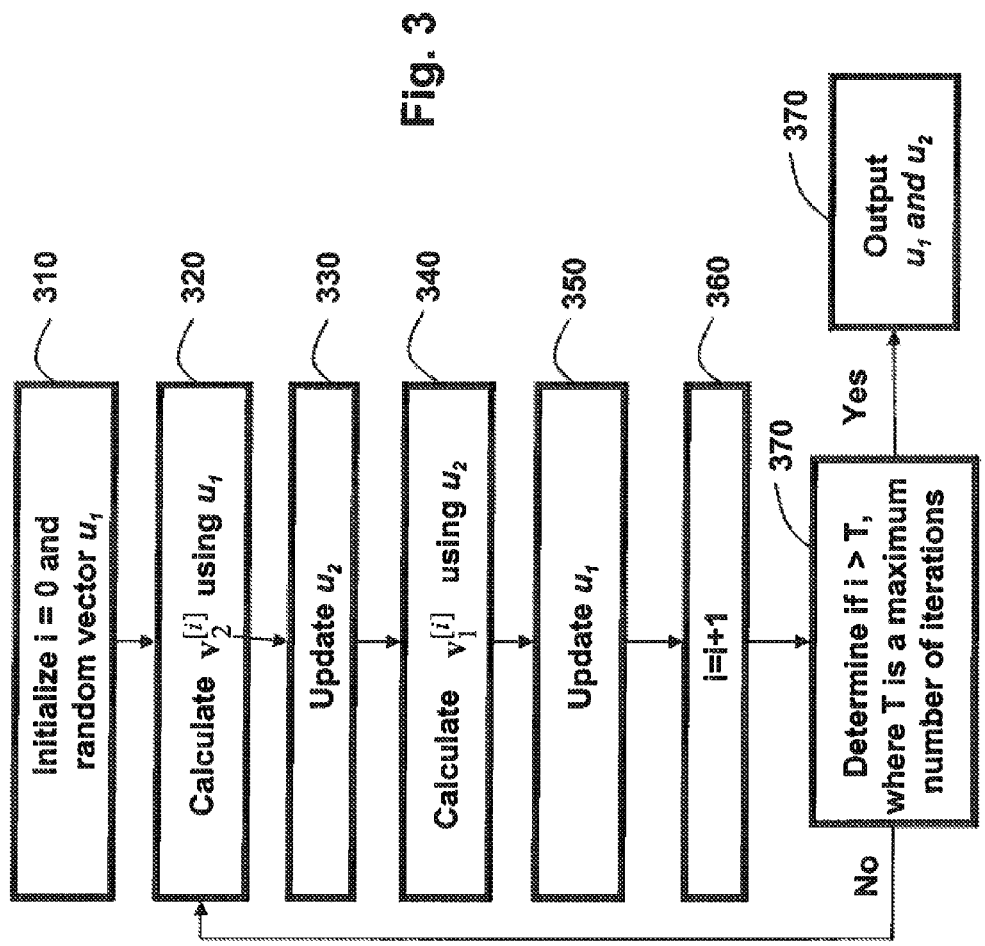
FIG. 3 is a flow diagram of a method for optimizing the precoding vectors by iteratively orthogonalizing interference according to embodiments of the invention.

As shown in FIG. 3, step 310 initializes random vectors $u_1$ and the iteration index to zero.

Step 320 determines $v_2^{[i]}$ according to Eqn. (2).

Step 330 updates $u_2$.

Step 340 determines $v_1^{[i]}$ according to Eqn. (3).

Step 350 updates $u_1$

Step 360 increases the iteration index by one and 370 checks if the iteration index exceeds a predetermined maximum number of iterations T. If no, returns to 320.

Otherwise if yes, step 380 outputs $u_1$ and $u_2$.

Multi-User Diversity Gain

With multiple mobile stations in each cell, multi-user diversity gain can be exploited to provide further network performance improvement by scheduling the proper mobile stations to serve in each time slot in each cell. Rather than exhaustively searching among all mobile station combinations to maximize the sum rate given by Eqn. (7), our method uses a low-complexity mobile station selection criterion for scheduling.

At high SNR, Eqn. (4) can be approximated by dropping the identity matrix on the right hand side. Factoring out P and ignoring the length of the interference vector, we obtain $$R_1 \approx \log \left| \sum_{i=1}^{M-1} (a^{[i]})^2 H_{11}^{[i]} H_{21}^{[i]-1} u_2 u_2^\dagger H_{21}^{[i]-\dagger} H_{11}^{[i]\dagger} + u_1 u_1^\dagger \right| + (M-1)\log P \quad (15)$$

$$= 2\log(\text{abs}(|A_1|)) + (M-1)\log P,$$

where $$A_1 = [a^{[1]} H_{11}^{[1]} H_{21}^{[1]-1} u_2 \ldots a^{[M-1]} H_{11}^{[M-1]} H_{21}^{[M-1]-1} u_2 u_1] \quad (16)$$

Likewise, we have $$R_2 \approx 2 \log(\text{abs}(|A_2|)) + (M-1)\log P \quad (17)$$

where $$A_2 = [b^{[1]} H_{22}^{[1]} H_{12}^{[1]-1} u_1 \ldots b^{[M-1]} H_{22}^{[M-1]} H_{12}^{[M-1]-1} u_1 u_2].$$

From Eqns. (15) and (17), we can approximate R as $$R \approx 2 \log(\text{abs}(|A_1|) \text{abs}(|A_2|)) + 2(M-1)\log P \quad (18)$$

Therefore, maximizing R corresponds to maximizing the product of determinants, $\text{abs}(|A_1|)\text{abs}(|A_2|)$.

The determinant at one base station does not depend on the channels of the mobile stations in the other cell because the length of the interference vector is ignored, while the sum rate of one cell depends on those mobile stations.

This observation leads to the conclusion that the mobile station selection can be done separately by the base stations. In cell 1, two mobile stations can be selected to maximize the determinant of $A_1$ given by Eqn. (16). This can be done similarly and separately in cell 2. Such separation greatly reduces the number of searches compared to that required if we select mobile stations based on the sum rate expression in Eqn. (7). For example, if two out of ten mobile stations in each cell are selected, only 90 searches (45 per cell), are required using the determinant criterion. Whereas, $45^2 = 2025$ searches are required if we jointly search for the mobile stations in the two cells that achieve the largest sum rate.

Spectrally Efficient Communications Protocol with Relay Nodes

Figure 4:
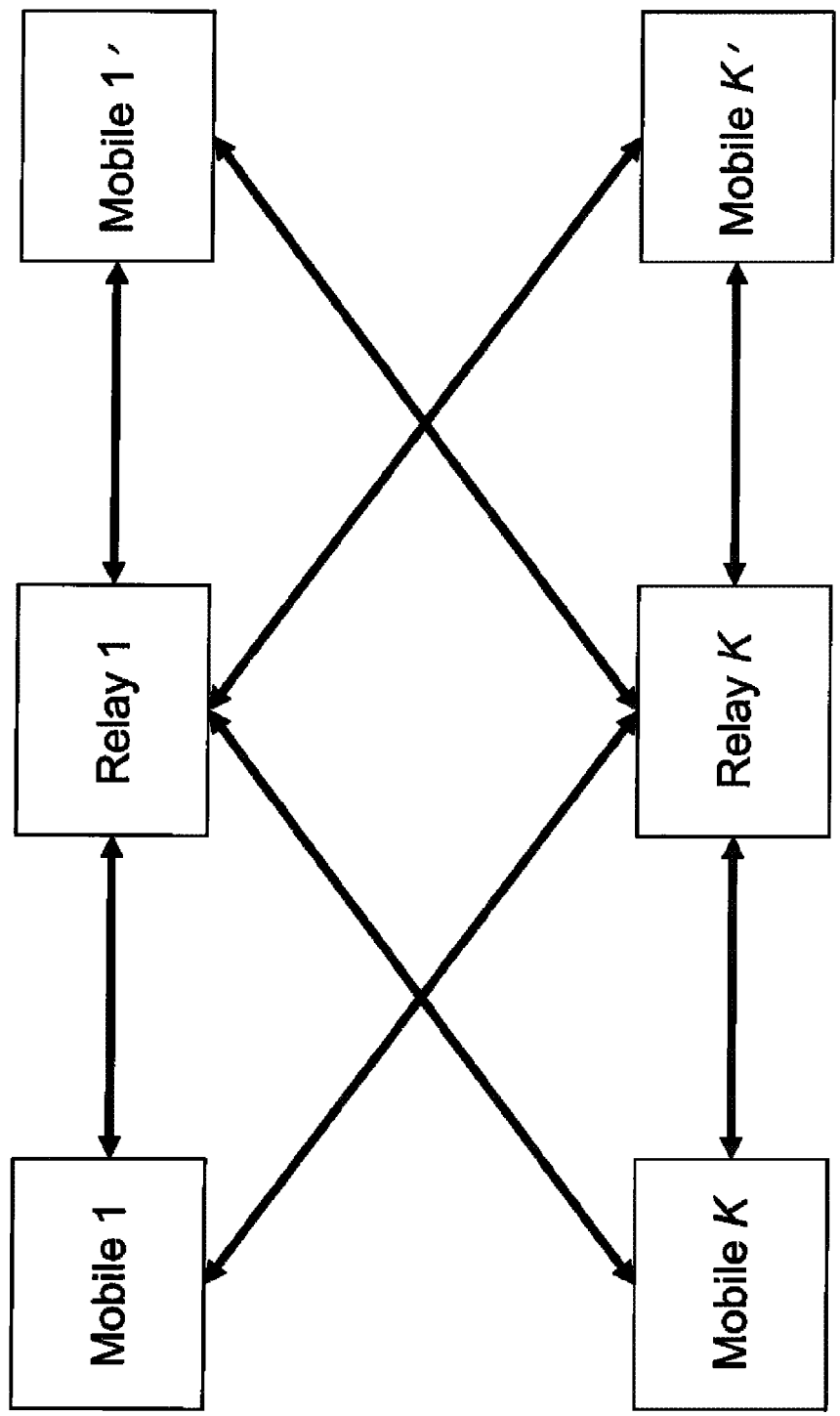
FIG. 4 is a schematic of a wireless network including pairs of mobile stations and relay nodes according to embodiments of the invention.

In the presence of relay nodes as shown in FIG. 4, our invention can be further incorporated into a spectrally efficient communications protocol. The network includes K pair of mobile stations (User 1, . . . , User K, User 1', . . . , User K') that exchange data with the assistance of K bidirectional relay nodes (relay 1, . . . , Relay K'). All mobile stations and relay nodes have N antennas. Without the assistance of the of relay nodes, th mobile stations would have to orthorganalize their transmissions in either time, frequency or spatial domains. In contrast, the embodiments of the invention enable simultaneous transmission from all mobile stations by leveraging the relay nodes. Furthermore, to maximize the total data rate, the interference alignment technique provided above is utilized to compute the precoding matrices of mobile stations and relay nodes.

As shown in FIG. 5, step 510 randomly initializes the precoding matrices of mobile stations $v_k$.

In step 520, all mobile stations transmit precoded signals simultaneously to the relay nodes.

Step 530 derives the precoding matrices $P_j$ of each relay node based on the received signals.

In step 540, all relay nodes precode their received signals with $P_j$ before broadcasting the precoded signals to the mobile stations.

In step 550, each mobile station performs successive cancellation to decode the received signals data.

Step 560 updates the optimal number of data streams supported by each mobile station.

Step 570 then updates the precoding matrix $V_k$ of each mobile station based on the channel covariance matrix. The update of mobile station $V_k$ can be performed based on the gradient-based procedure shown in FIG. 2 or the iterative method shown in FIG. 3.

Finally, Step 580 examines if $V_k$ and $P_j$ have converged. If not, return to Step 520.

Otherwise, if yes, step 590 outputs $V_k$ and $P_j$.

Effect Of The Invention

Compared to the conventional methods, our invention has the following advantages.

Our method can provide optimized precoding vectors for general MIMO wireless networks with an arbitrary number of mobile stations.

The method does not require a large number of iteration times to obtain near-optimal alignment directions.

The method enables each base station to determine precoding vectors for the mobile stations in the associated cell. That is the determination is performed without having to exchange information with other base stations, and is solely dependent on signals received form mobile stations.

The method selects the optimal mobile stations in scheduling in an efficient manner by searching independently in each cell.

The method can decrease the required amount of overhead that is used by multiple base stations.

The method can be embedded into a highly spectrally efficient communications protocol in the presence of relay nodes.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for reducing interference in a wireless network, wherein the network includes a set of cells, and wherein each cell includes a base station and a set of mobile stations associated with the base station, comprising:

obtaining, at the base station, channel information between the base station and the set of mobile stations, wherein the channel information is based on signals received from the set of mobile stations at the base station;

deriving independently, at the base station, precoding vectors for the set of associated mobile stations such that the precoding vectors minimize inter-cell interference and attain a maximum sum data rate over for the set of cells, wherein the precoding vectors are based on a set of parameters, and further comprising:

partitioning the set of parameters into subsets;

optimizing the subsets of parameters iteratively until a termination condition is satisfied; and optimizing one subset of parameters while holding the other subsets of parameters fixed, and wherein the optimizing is local over each subset of parameters, and is based on a gradient based procedure, and the optimizing differentiates a cost function with respect to the one subset of parameters while holding the other subsets of parameters fixed.

2. The method of claim 1, wherein the optimizing is local over each subset of parameters and is based on a interference-orthogonalizing procedure, and the optimizing updates the precoding vector by orthogonalizing to a subspace spanned by interference signals.

3. The method of claim 1, wherein each cell further includes a set of relay nodes, and further comprising:

deriving precoding vectors at each relay node based on the signals received at the relay node;

broadcasting the signals received at ach relay node using the precoding vectors derived at the relay node.

* * * * *